United States Patent [19]

Rockwood et al.

[11] 4,406,465
[45] Sep. 27, 1983

[54] CENTRIFUGAL PUMP

[75] Inventors: Robert E. Rockwood, Windham; Richard P. Antkowiak, Hampstead, both of N.H.

[73] Assignee: A. W. Chesterton Company, Stoneham, Mass.

[21] Appl. No.: 419,992

[22] Filed: Sep. 20, 1982

Related U.S. Application Data

[62] Division of Ser. No. 408,043, Aug. 13, 1982.

[51] Int. Cl.³ ............................................. F16J 15/34
[52] U.S. Cl. ................................... 277/96.1; 277/204
[58] Field of Search ........................ 277/96, 96.1, 96.2, 277/204

[56] References Cited

U.S. PATENT DOCUMENTS

| 2,294,105 | 8/1942 | Wallgren | 277/96.1 |
| 2,467,312 | 4/1949 | Jack | 277/96.1 |
| 3,167,021 | 1/1965 | Sence | 103/103 |
| 3,372,906 | 3/1968 | Griffith | 253/39 |
| 3,652,179 | 3/1972 | Hagen | 415/111 |
| 3,732,029 | 5/1973 | Raymond et al. | 415/111 |
| 3,999,897 | 12/1976 | Strub | 417/424 |
| 4,174,844 | 11/1979 | Zobens | 277/96.2 |
| 4,235,480 | 11/1980 | Olschewski et al. | 227/204 |

Primary Examiner—Robert I. Smith

[57] ABSTRACT

A centrifugal pump having a packing seal in which rope packing is compressed between two facing seal walls extending radially from the pump shaft, one wall being on a stationary seal gland and the other wall being on a rotary member attached to the shaft.

8 Claims, 9 Drawing Figures

CENTRIFUGAL PUMP

This is a division of application Ser. No. 408,043, filed August 13, 1982.

BACKGROUND OF THE INVENTION

This invention relates to centrifugal pumps and to improved sealing means for such pumps.

In typical centrifugal pumps employing packing, the packing is usually wrapped on the shaft and a seal gland applies axial pressure to create radial force against the shaft and an opposed sealing surface.

SUMMARY OF THE INVENTION

The invention features packing seal means for sealing about a rotating shaft having in combination a seal gland having a central opening for mounting about a shaft, the seal gland being adapted for axially adjustable connection to a stationary member through which the shaft extends, and a rotary member adapted for mounting on and rotation with the shaft, the seal gland and the rotary member having opposed, facing, radially extending sealing walls adapted for relative rotation and characterized in that one of the sealing walls has a flange extending axially toward the other wall and spaced from the position of the shaft extending through the walls, whereby rope packing may be secured between the walls and between the flange and the position of the shaft for sealing the relative rotatable walls, and whereby pressure between the packing and the walls being sealed may be directly adjusted by adjustment of the seal gland.

In preferred embodiments, the flange is an outer flange and the one sealing wall also has an inner flange spaced radially inwardly from the outer flange adjacent the shaft position and defining with the outer flange a recess in the one wall for receiving the packing; the sealing wall of the seal gland and the rotary member are enclosed in a seal housing, the seal gland being connected to and closing one end of the seal housing, and at the other end of the seal housing the rotary member has an outwardly facing labyrinth seal and the seal housing has a cylindrical inner surface closely spaced to and facing the labyrinth seal; the labyrinth seal has a helical thread oriented to hydrodynamically pump fluid outwardly from the seal housing upon rotation of the shaft; there is an annular static seal positioned between the seal gland and the seal housing at the connection between them; the rotary member in the seal housing, at a position spaced away from the one end thereof, has an inwardly radially extending annular sealing wall adapted to engage an annular radially extending wall defined at a reduced diameter portion of the shaft, and an annular static seal positioned thereat; the wall of the rotary member is the sealing wall having the flange; and the axial extent of the flanges is less than the thickness of a predetermined packing and the radial spacing of the flanges is at least twice the packing thickness.

The packing seal provides an efficient, adjustable seal by compressing one sealing wall against the other; uses conventional packing material (which is easily changed); and eliminates shaft wear caused by the packing.

Other objects, features and advantages of the invention will be apparent from the following description of the preferred embodiments and from the claims.

DESCRIPTION OF THE PREFERRED EMBODIMENTS

We first briefly describe the drawings.

Drawings

STRUCTURE AND OPERATION

Figure 1:
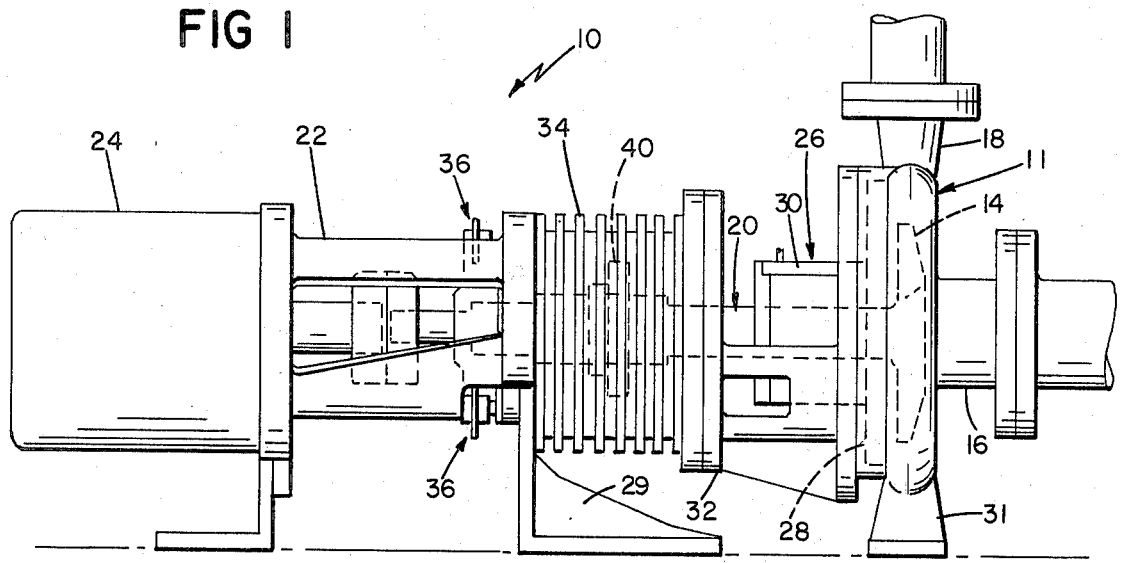
FIG. 1 is a side elevation view of the pump assembly.

Referring to FIG. 1, in pump assembly 10, pump housing 11 defines an impeller chamber 12 (shown in FIG. 2) in which impeller 14 rotates to pump fluid from pump inlet 16 to pump outlet 18. Impeller 14 is mounted on one end of shaft 20, the other end of which is (by means of direct mount motor adaptor 22) coupled to and aligned with the shaft of motor 24. Behind pump housing 11, shaft 20 is enclosed by a removable seal housing 26 which is bolted to the backplate 28 of pump housing 11. Also bolted to pump housing 11 is one end of a bearing frame adaptor 32, the other end of which is bolted to bearing housing 34 (which serves as a shaft support for the end of the shaft opposite the impeller) to assure the axial alignment of shaft 20, pump housing 11 and bearing housing 34. Adjustable fastening means 36 are positioned behind bearing housing 34 for adjusting the axial position of impeller 14. Rear foot 29 and casing foot 31 support the pump assembly, foot 29 extending on each side of the center of gravity of the assembly when disconnected from the impeller.

Figure 2:
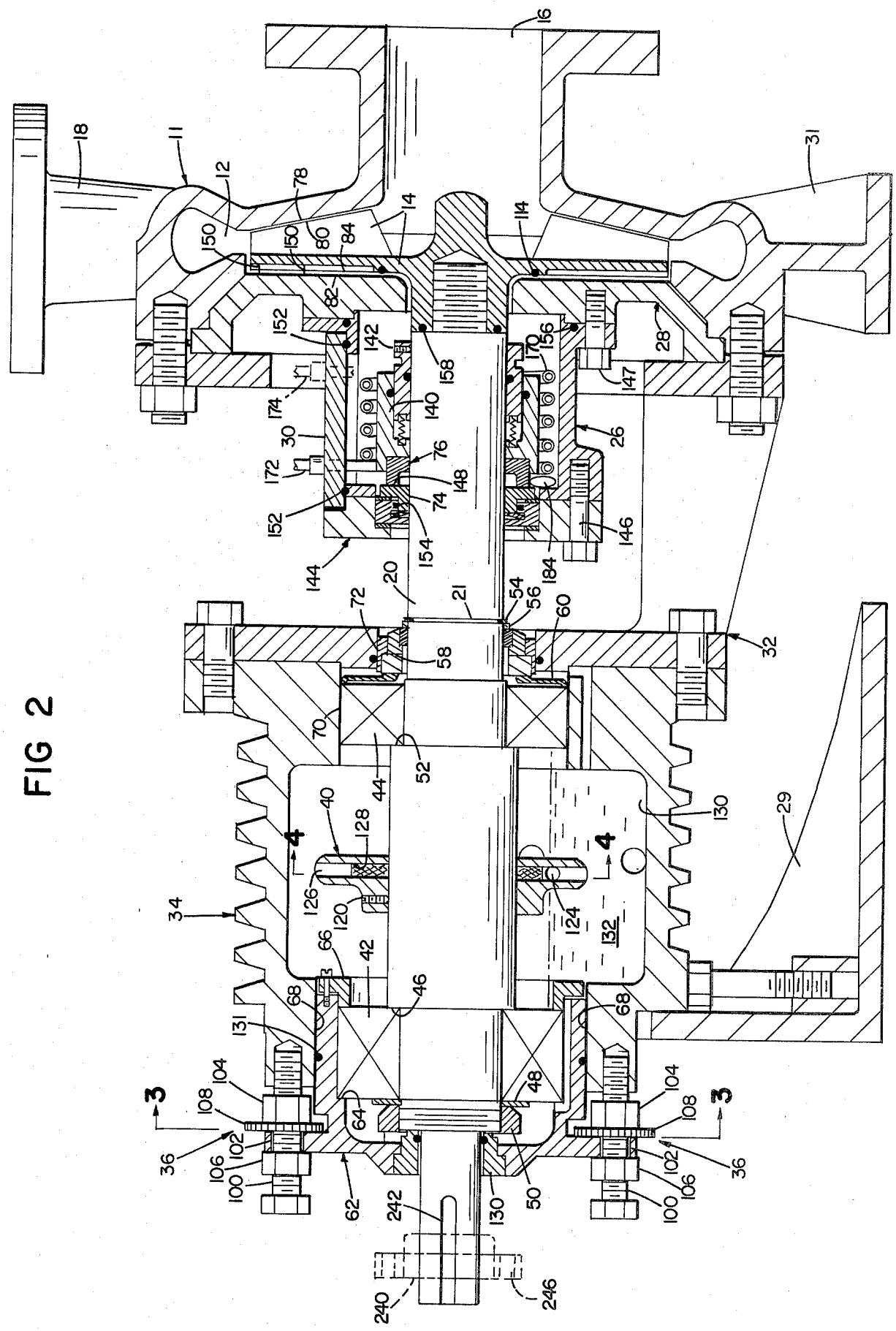
FIG. 2 is an enlarged sectional view of the pump assembly of FIG. 1 with the motor and motor adaptor removed, showing one type of seal housing.

Referring to FIG. 2, which shows the pump in greater detail, shaft 20 is supported rotatably by a pair of bearings 42, 44 housed within bearing house 34. The position of rear bearing 42 is fixed axially with respect to shaft 20 by recessed shaft surface 46 (adjacent the forward end of bearing 42) and by washer 48 and threaded retainer nut 50 (adjacent the rearward end). Bearing 42 is also held fixed within a bearing cartridge 62 by retaining surface 64 and by retaining ring 66 which is bolted to the bearing cartridge. Similarly, the position of front bearing 44 on shaft 20 is set (on the rear end) by recessed shaft surface 52. A spring retaining ring 54 (which seats in groove 21 in shaft 20) and retainer 56 together force oil seal 58 and coupling ring 60 against the front end of bearing 44, and assure proper seal compression of seal 58.

The shaft assembly, including shaft 20, bearings 42, 44, bearing cartridge 62, and impeller 14 (which is screwed onto the threaded front end of shaft 20), is free to be moved axially, because the cylindrical outer surface of the cartridge housing 62 is free to slide in the cylindrical bearing housing bore 68 in which it is mounted, the cylindrical outer surface of cylindrical bearing 44 is free to slide in the bearing housing bore 70 in which it is mounted, the cylindrical outer surface of oil seal 58 is free to slide in cylindrical bearing frame adaptor bore 72 in which it is mounted, and shaft 20 is free to slide in the stationary element 74 of seal 76. The axial excursion of the shaft assembly is limited in one direction by the radially extending wall 78 of pump housing 11, which is adjacent to the leading edge 80 of impeller 14, and in the other direction by radially extending face 82 of backplate 28 which is adjacent to the trailing edge 84 of impeller 14.

The axial position of the shaft assembly is determined by adjustable fastening means 36 which comprise two bolts 100 (e.g., ½-20 or ½-13) which pass through clearance holes 102 in bearing cartridge 62 and are firmly screwed into the back of bearing housing 34, and a reference nut 104 and a locknut 106 screwed onto each bolt 100, with the bearing cartridge between them, so that they can be tightened down onto the bearing cartridge to adjust and fix its axial position.

Figure 3:
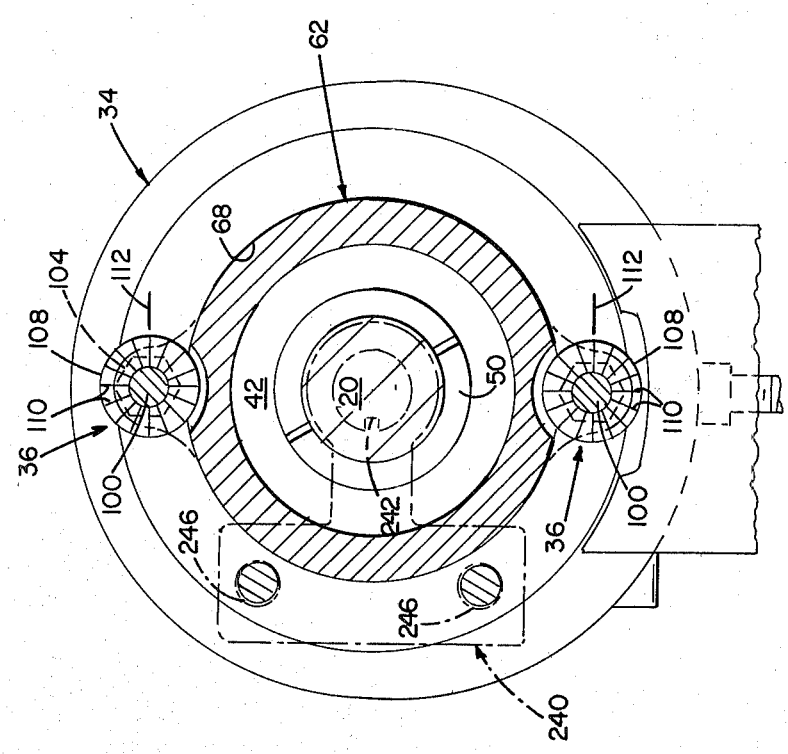
FIG. 3 is a view, taken along line 3—3 of FIG. 2.
Figure 9:
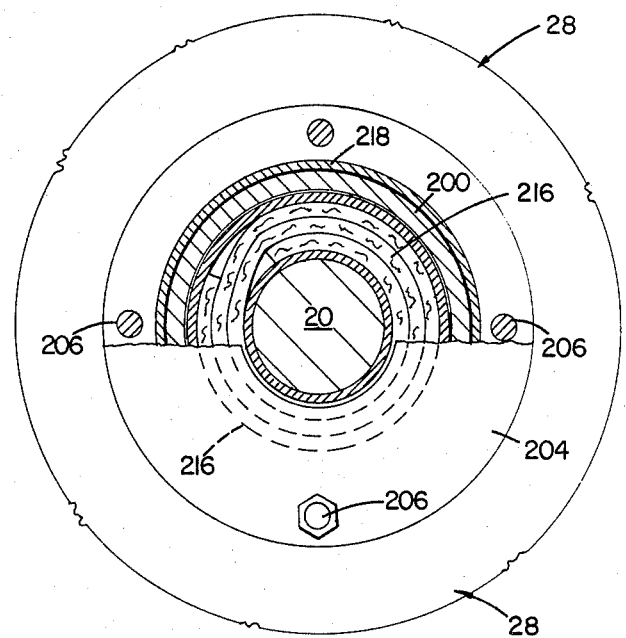
FIG. 9 is a view, partially broken away, taken along line 9—9 of FIG. 8.
Figure 8:
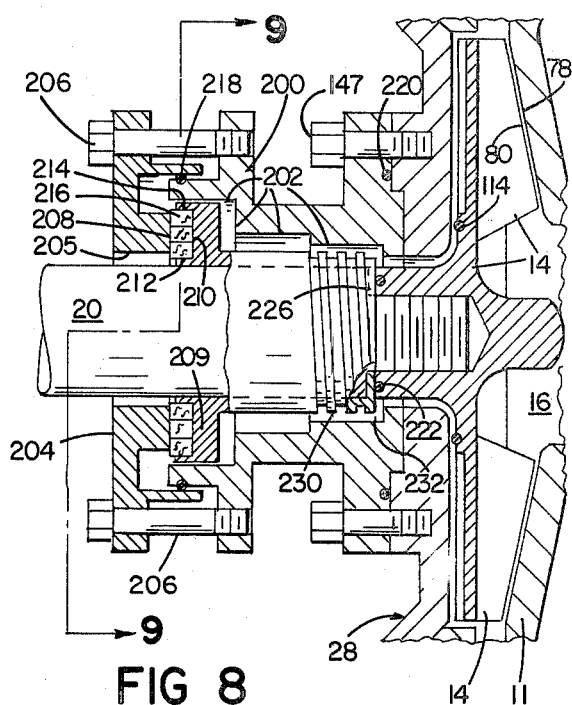
FIG. 8 is a sectional view similar to FIG. 5 showing an alternative seal housing containing a packing seal.

Referring to FIG. 3, each reference nut has a rim portion 108 on which marks 110 are inscribed at regular angular intervals (e.g., 22.5°) and are readable in connection with reference marks 112 on bearing housing 34.

In operation, the axial position of the impeller is adjusted so that the gap between edge 80 and wall 78 will provide optimum pumping efficiency, e.g., a gap of 0.015 inch. This is accomplished by loosening reference nuts 104 toward the front of the pump assembly and tightening locknuts 106 also toward the front of the pump assembly, until the shaft assembly reaches an axial position at which the impeller leading edge strikes the pump housing wall 78. The position of each reference nut compared with its associated reference mark 112 is noted. The locknuts are backed off and the reference nuts are then turned back towards the back of the pump assembly by a number of marks 110 which correspond to the desired impeller gap (as determined by the angular spacing between the marks and the pitch of the threads of bolts 100). As the impeller blades wear, the shaft assembly can be moved forward a precise distance to reposition the impeller by a similar use of reference nuts 110. By recording the total amount of such adjustments for wear, it is possible to determine easily when the impeller should be replaced. The adjustable fastening means 36 also permits backing off the shaft assembly to the point where the rear surface 84 of the impeller reaches the pump housing wall 82, and when so backed off an O-ring seal 114 in the back wall of the impeller seals off seal housing 26 from fluid located in the impeller chamber 12, so that work can be performed in the seal housing without the presence of the fluid and without need of draining fluid from impeller chamber 12.

Figure 4:
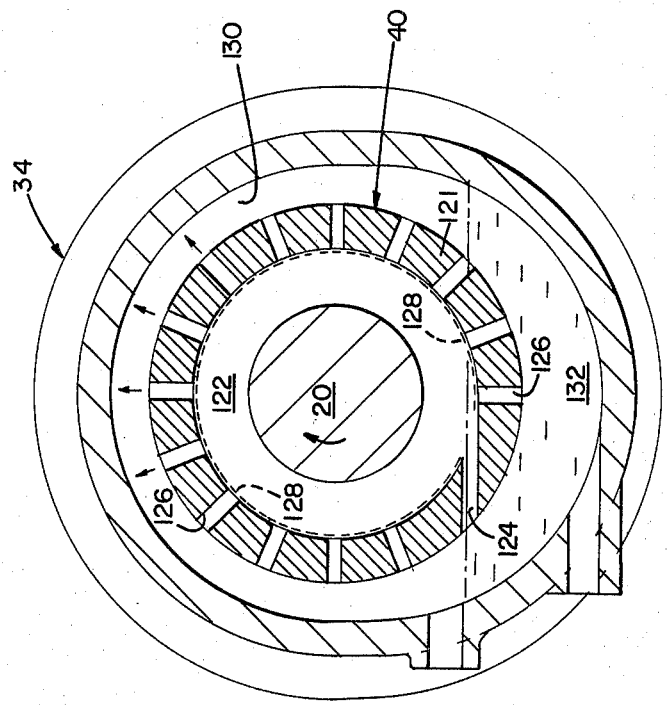
FIG. 4 is a view, taken along line 4—4 of FIG. 2.

Referring to FIGS. 2 and 4, a centrifugal lubricator 40 (of metal or plastic) is positioned in bearing housing 34 for lubricating bearings 42, 44. Lubricator 40 is fixed to shaft 20 by set screw 120. Lubricator 40 has an annulus 121 with a circular internal tube 122 the inner wall of which is defined by the surface of shaft 20. A tubular passage through the outer wall of annulus 121 defines entrance opening 124 tangential to the tube. A number of spaced exit opening 126 (oriented radially from shaft 20) in its side pass through the outer periphery of the annulus. Mesh screen 128 (e.g., nylon with mesh openings between 50 and 300 microns) is arranged around the inner wall of the tube covering the exit openings.

The inner surface of bearing housing 34 is contoured to define an oil reservoir 130 containing oil 132 to a level such that oil can enter entrance opening 124 during each rotation of lubricator 40 on shaft 20. Oil which has entered tube 122 is thrown centrifically out through exit openings 126 (after passing through screen 128, which removes carbon and particulate contaminants). Oil seals 58 and 130 (housed in the opposite ends of the bearing housing) and oil seal 131 on the outer surface of bearing cartridge 62 prevent leakage of oil from the bearing housing.

Figure 6:
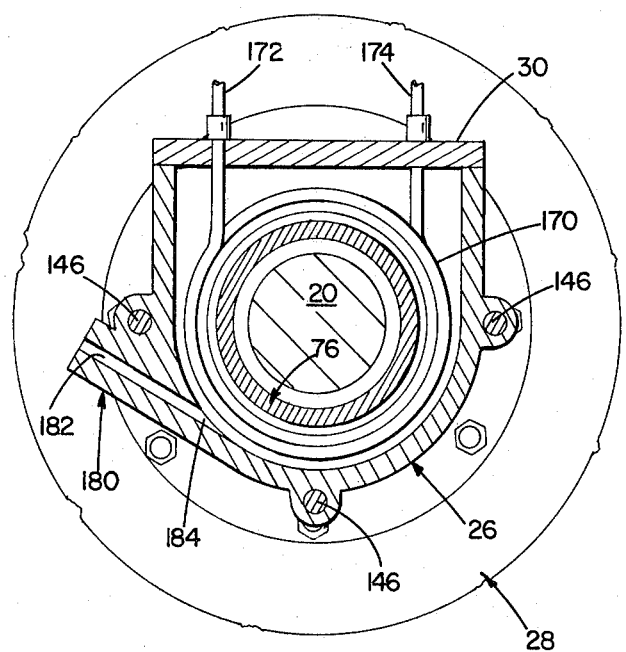
FIG. 6 is a view, taken along line 6—6 of FIG. 5.
Figure 5:
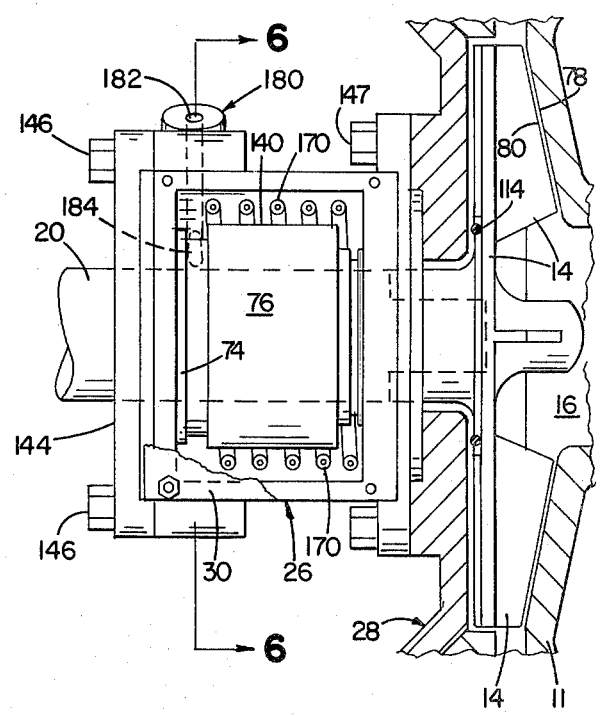
FIG. 5 is a plan view, partly in section and partly broken away, of the seal housing and pump housing.

Referring to FIGS. 2 and 5, seal housing 26 contains a mechanical seal 76 (e.g., a seal sold by A. W. Chesterton Co., Stoneham, Mass. under the trademark 880) having a rotating element 140 (attached by set screw 142 to shaft 20) and a corresponding stationary element 74 held in place by seal gland 144 bolted by bolts 146 to the seal housing. The seal housing is demountably connected by bolts 147 to the backplate 28. The rotating element and stationary element bear against one another rotatably at seal surface 148. Seal 76 prevents leakage to the outside of the pump of any fluid which (instead of being pumped into pump outlet 18) follows a fluid path over and behind impeller 14, along cavity 150 on the back of the impeller and into the seal housing. Leakage of such fluid from the seal housing is also prevented by static (e.g., O-ring) seal 152 (between cover 30 and seal housing 26), seal 154 (between the seal gland and the stationary element of the seal), seal 156 (between the seal housing and the backplate of the pump housing), and seal 158 (between the impeller and the shaft). Cover 30 permits access to seal 76 and shaft 20 within seal housing 26 for repair, impeller 14 being backed to face 82 before cover 30 is opened to seal chamber 12 from seal housing 26. Seal housing 26 may also contain a cooling coil comprising a coil of tubing 170 (e.g., ¼" or ⅜" in diameter) centered on the axis of the shaft and positioned about seal 76 (there being a larger than usual space of about 1" between the outer surface of shaft 20 and the inner surface of seal housing 26 which can also accommodate electronic pressure and temperature transducers). The ends of tubing 170 pass through and are held by cover 30 and the ends form entrance and exit openings 172, 174, (FIG. 6) outside cover 30. Cooling fluid can be pumped through the cooling coil to cool the seal.

Figure 7:
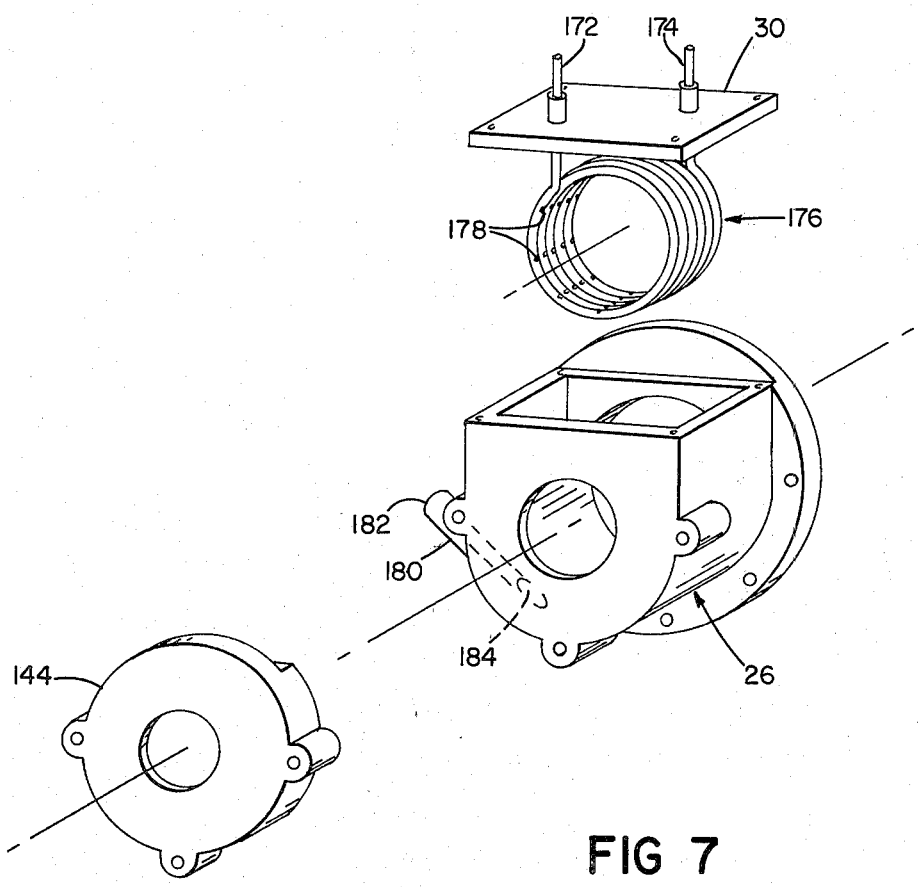
FIG. 7 is an isometric exploded view of a seal housing with alternate coils attached to the cover.

Referring to FIG. 7, alternatively a flushing coil 176 (similar in size and configuration to the cooling coil) can be attached to cover 30. The flushing coil has a number of holes 178 through which flushing fluid (pumped into the flushing coil) is sprayed into the seal housing to flush it during pump operation.

Flushing of the seal housing can alternately be accomplished through flushing apparatus comprising a flushing tube 180 (FIGS. 5, 6 and 7) having an entrance end 182 outside of the seal housing and an exit end 184 extending through a side wall of the seal housing and oriented to direct flushing fluid into the seal housing in a direction having a component tangential to the interior of the side wall of the housing and in a plane normal to the shaft axis. The flush tube enters the seal housing at the rear end of the housing next to the seal gland which assures that the entire seal housing will be thoroughly flushed. The tangential orientation enables the fluid to follow the natural curvature of the inside wall, and prevents flushing fluid from striking the seal directly, which reduces vibration and wear and assures efficient seal operation while flushing.

Because of its demountable connection, seal housing 26 can be easily replaced with housings of any other desired configuration. For example, referring to FIGS.

8, 9, seal housing 26 may be replaced by demountable packing seal housing 200 (bolted onto backplate 28) which has a stepped interior surface 202 and is closed at its back end by a seal gland 204 which is adjustably bolted on by bolts 206. Gland 204 has a central clearance hole 205 (through which shaft 20 passes) and a radially extending sealing wall 208 facing towards the impeller. A cylindrical rotary member 209 (fixed on shaft 20) has a corresponding radially extending sealing wall 210 which has an inner flange 212 close to the shaft and an outer flange 214 spaced apart from the shaft so that sealing wall 210 and flanges 212, 214 form a recess in which rope packing 216 (e.g., ⅜" or 5/16" by 22" long) can be spirally wrapped. The radial spacing of the two flanges is at least twice the packing thickness. The axial extent of the flanges is less than the packing thickness so that as gland 204 is tightened down using bolts 206, the packing is compressed axially between the sealing walls 208, 210. Packing 216 nowhere touches shaft 20 and so causes no wear of the shaft. Packing 216 is held fixed on rotary member 209 so the sealing surface is between wall 208 and packing 216. Alternatively, the flanges can be part of the seal gland, the packing can be held fixed in the sealing gland and the sealing surface can be defined between sealing wall 210 and the packing. The space within the seal housing is sealed against leakage by static O-rings seals 218 (between seal gland 204 and seal housing 200), 220 (between the front outer wall of seal housing 200 and backplate 28), and 222 (between the rear end surface of the impeller and the rear radially inwardly extending surface 226 of rotary member 209). Rotary member 209 extends along shaft 20 from seal gland 204 toward impeller 14 and is provided at its end adjacent backplate 28 with a helically threaded outwardly facing labyrinth seal 230 closely spaced to, e.g., 0.005 inch away from, facing inner surface 232 of the seal housing. The helical labyrinth seal 230 hydrodynamically pumps fluid outwardly from the seal housing upon rotation of the shaft, reducing fluid pressure within the seal housing.

Referring to FIGS. 2, 3, for locking shaft 20 against rotation during repair work, removable shaft lock 240 (shown in broken lines) may be employed which has a central hole which fits over shaft 20 the hole having a key 242 which mates with a keyway 244 provided in shaft 20. The outer periphery of the shaft lock has a pair of holes 246 corresponding to threaded holes on the back face of the bearing cartridge for bolting on the shaft lock to prevent rotation of the shaft assembly.

Other embodiments are within the following claims.

We claim:

1. Packing seal means for sealing about a rotating shaft comprising in combination a seal gland having a central opening for mounting about a shaft, said seal gland adapted for axially adjustable connection to a stationary member through which said shaft extends, and a rotary member adapted for mounting on and rotation with said shaft, said seal gland and said rotary member having opposed, facing, radially extending sealing walls adapted for relative rotation and characterized in that one of said sealing walls has a flange extending axially toward the other said wall and spaced from the position of said shaft extending through said walls, whereby rope packing may be secured between said walls and between said flange and the position of said shaft for sealing said relative rotatable walls, and whereby pressure between said packing and said walls being sealed may be directly adjusted by adjustment of said seal gland.

2. The packing seal means claimed in claim 1 further characterized in that said flange is an outer flange and said one sealing wall further comprises an inner flange spaced radially inwardly from said outer flange adjacent said shaft position and defining with said outer flange a recess in said one wall for receiving said packing.

3. The packing seal means claimed in claim 2 further characterized in that said sealing wall of said seal gland and said rotary member are enclosed in a seal housing, said seal gland being connected to and closing one end of said seal housing, and at said other end of said seal housing said rotary member comprises an outwardly facing labyrinth seal and said seal housing comprises a cylindrical inner surface closely spaced to and facing said labyrinth seal.

4. The packing seal means claimed in claim 3 in which said labyrinth seal comprises a helical thread oriented to hydrodynamically pump fluid outwardly from said seal housing upon rotation of said shaft.

5. The packing seal claimed in claim 3 in which an annular static seal is positioned between said seal gland and said seal housing at the connection therebetween.

6. The packing seal means claimed in claim 5 further characterized in that said rotary member in said seal housing, at a position spaced away from said one end thereof, has an inwardly radially extending annular sealing wall adapted to engage an annular static seal.

7. The packing seal means claimed in any of claims 1-6 in which said wall of said rotary member is said one sealing wall having said flange.

8. The packing seal means claimed in claim 7 in which the axial extent of said flanges is less than the thickness of a predetermined said packing and the radial spacing of said flanges is at least twice said packing thickness.

* * * * *

UNITED STATES PATENT AND TRADEMARK OFFICE
CERTIFICATE OF CORRECTION

PATENT NO. : 4,406,465
DATED : September 27, 1983
INVENTOR(S) : Robert E. Rockwood, Richard P. Antkowiak It is certified that error appears in the above-identified patent and that said Letters Patent are hereby corrected as shown below:

In the title, "Centrifugal Pump" should be --Packing Seal--;

Column 5, line 27, "O-rings" should be --O-ring--.

Signed and Sealed this

Twenty-second Day of November 1983

[SEAL]

Attest:

GERALD J. MOSSINGHOFF

Attesting Officer

Commissioner of Patents and Trademarks